Sept. 20, 1927.  1,643,037
E. VOLLRATH
BELT CLAMP
Filed Jan. 31, 1927  2 Sheets-Sheet 1
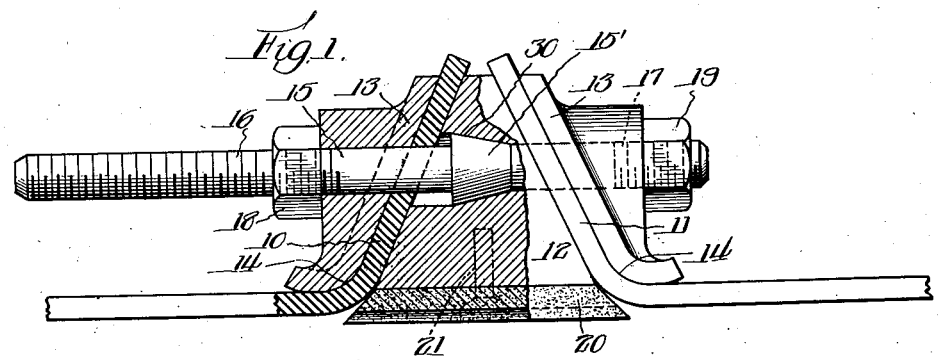
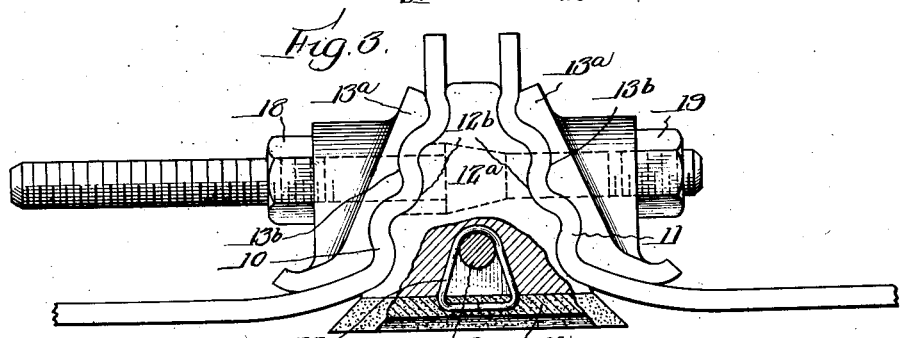
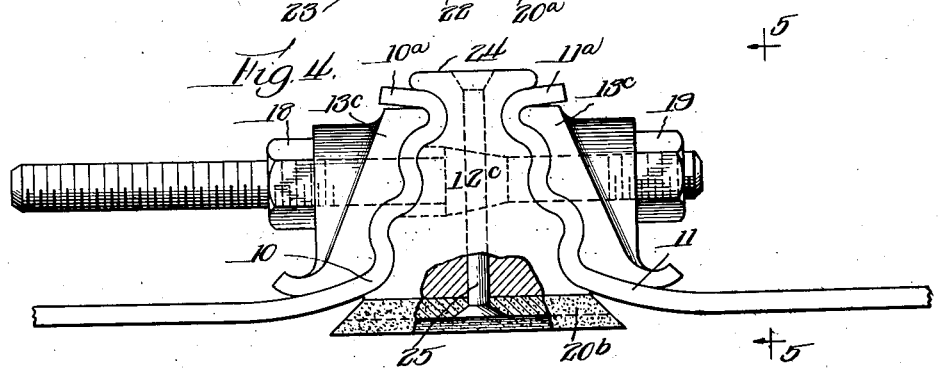
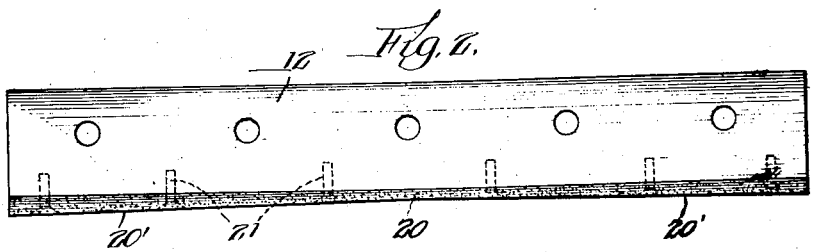
Inventor
Edwin Vollrath,
By Fisher, Towle, Clapp & Soans
Attys.

Sept. 20, 1927.

E. VOLLRATH 1,643,037

BELT CLAMP

Filed Jan. 31, 1927

Inventor:
Edwin Vollrath,
By Fisher, Towle, Clapp & Soans
Attys.

Patented Sept. 20, 1927.

1,643,037

UNITED STATES PATENT OFFICE.

EDWIN VOLLRATH, OF EASTON, PENNSYLVANIA.

BELT CLAMP.

Application filed January 31, 1927. Serial No. 164,786.

This invention relates to improvements in devices for connecting cut ends of belting, making a continuous, running joint, so that the belt may operate over pulleys. The device of the present invention is equally well adapted for use on belts of any material, and one object of the invention is to provide a belt clamp which will make the joint between the ends of the belt as nearly as possible equal in strength to the body of the belt, and at the same time provide for the easy passage of the belt around a pulley which is not a cylinder, but which is slightly tapered from the center toward both ends, or from the ends toward the center; many pulleys in common use being made up with tapered faces, sloping at a standard angle from the center toward the edge and equally tapered on both sides of the center plane of the pulley.

Numerous belt clamps for uniting the cut ends of a belt are known, some consisting of two flat bars of steel with connecting bolts which pass through the ends of the belt, and other devices having various forms of inserts or fillers between the ends of the belt. Some of these devices bend the belt ends at approximately a right angle, and others are riveted, or otherwise attached, to the belt without bending. Up to the present, however, engineering tests have shown that none of the devices now in use approximates the strength of the belting connected, and the belt stressed to the breaking point will always fail at these joints.

One purpose of the present invention is to provide a device which will enable the maximum strength of the highest class of belting to be utilized.

Further than this, when a belt made in plies is bent sharply around a curved edge at too great an angle, the plies on the concave side of the bend are compressed, and the entire stress in the belt is transferred to the plies on the convex side of the bend; hence, the belt itself is weakened at this critical point, and, in addition to this, the action of the belt in passing around the pulleys causes wear against the edge of the clamp, which in time destroys the plies that travel in contact with the pulley. Another object of the invention is to provide a belt clamp which will eliminate the above-noted fault.

Again, there is a difficulty in the passage of all existing clamps around the pulleys. If the clamp extends in one solid bar across the width of the belt and the joint is passed around a pulley consisting of two cones meeting in the center plane, the joint can bear on the pulley only at the meeting point of the bases of the cones or on the face of one of the cones, and hence the belt does not bear on the entire transverse surface of the of the pulley at the time the joint passes over the latter. If a joint be made of an even number of clamps disposed symmetrically on both sides of the center line of the belt, there is an appreciable distance at the center line through which the belt is not joined, and the strength of this interval which is not joined is entirely lost, making a weak spot in the belt at which the pressure of the two cones forming the pulley tends to burst the belt apart and in practice the belt is often so burst apart and split down the center line. Another object of the invention, therefore, is to provide an improved clamp which will make possible the use of a continuous, stiff bar across the face of the belt, and yet obtain full bearing on both sides of a conical pulley.

Belts are usually stretched in putting them on pulleys by some form of a stretcher, and while most of the belt is tight, there is a short part at each of the ends which is slack, and with fasteners now in use the rest of the belt must be overstrained to take up the slack part when the connector has been applied and the belt stretcher is removed. Another object of my present invention is to provide a belt clamp of such a character as to itself provide means for taking up the slack in the short ends thus avoiding the overstraining of the belt above referred to.

Other objects and attendant advantages of the invention will be apparent to persons skilled in the art as the same becomes better understood by reference to the following detail description taken in connection with the accompanying drawing, in which I have illustrated several practical and improved mechanical forms of the invention, and wherein—

Fig. 1 is an end elevation, partly in vertical section, of a simple form of my improved belt-clamp applied to the opposed, upturned ends of a belt;

Fig. 2 is a side elevation of the filler block and the cushion applied to the lower side thereof;

Fig. 3 is a view similar to Fig. 1, showing certain modifications of structure;

Fig. 4 is a view similar to Figs. 1 and 3, showing a still more efficient form of the invention;

Figure 5:
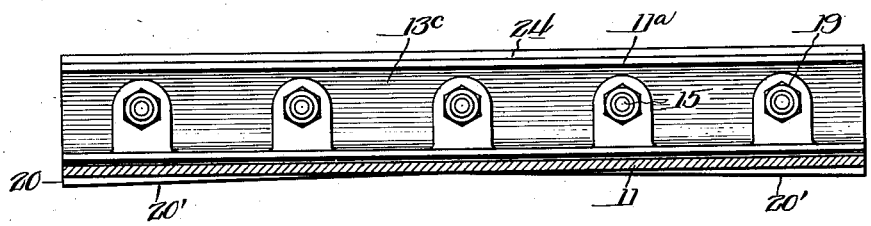
Fig. 5 is a side view of Fig. 4, in vertical section, through one of the belt ends.

Referring first to Figs. 1 and 2, 10 and 11 designate the upwardly-turned ends of the belt which are to be united. 12 designates a rigid filler-block of triangular form in cross section, disposed between the belt ends 10 and 11 with the latter lying in contact with the sloping sides thereof. 13 designates each of a pair of straight clamp-bars that lie against the outer surfaces of the belt ends 10 and 11 and are formed with rounded lower edges 14 which fit and support the bends of the belt at a relatively wide angle such as will avoid the undue compression of the upper or outer plies of the belt and the undue stretching of the lower or inner plies of the belt. This latter feature is, of course, facilitated by the provision of a filler block and clamp bars which grip the belt ends at angles less than a right angle to the main portion of the belt.

The filler block, belt ends and clamp bars are all formed with registering holes to accommodate the passage therethrough of long bolts, which make it possible to first attach the filler block, bolts, and one of the clamp bars to one belt end, then carry the bolts through the other belt end and clamp bar, and then draw the two ends of the belt tightly together on the filler block. This bolt 15, as shown in Figs. 1, 3 and 4, is formed with an intermediate, preferably conical, enlargement 15′, and on opposite sides of said enlargement with relatively long and short threaded portions 16 and 17, respectively, the extreme ends of the bolt being preferably tapered, as shown, to facilitate the passage thereof through the holes. On the threaded portions 16 and 17 are the clamping nuts 18 and 19, respectively, which, when run down on the bolt, serve to draw the clamp bars tightly together on the belt ends and the intermediate filler-block. To accommodate the enlargement 15′ of the bolt, the hole in the filler block is formed with a seat 30 tapered to fit the bolt enlargement 15′ and preferably countersunk in one end of the hole. The bolts are applied by first inserting their short, threaded portions through the filler block, one belt end and one of the clamp bars, then applying the nut 19 and screwing the latter down, which squeezes the filler block, belt end and clamp bar between the nut and the bolt enlargement 15′, which acts as a bolt-head. The long, threaded ends of the bolts are then passed through the other belt end, and the other clamp block, and the nuts 18 being applied are screwed down, thereby drawing the other belt end tightly up into engagement with the filler block and taking up the slack in the end portions of the belt lying between the usual belt-stretcher clamps. The described construction eliminates any stress on the enlargement 15′ of the bolt, the stress being applied equally to the opposite end portions of the bolt and the nuts. This makes it possible to hold the belt ends very firmly.

For strength the filler block is made straight, and the lower face thereof is a straight, plane surface. This would not bear on the double,-truncated-cone surfaces of ordinary pulleys, and the pounding due to a gap between the belt ends where they are bent would wear through the belt at the bent portions, besides losing the grip on the pulleys. To take care of this difficulty, I introduce at this opening a filling cushion 20 of compressible material, preferably of cotton textile material, impregnated with balata gum, which has great strength and resists wear while at the same time possessing the highest friction on iron or wood surfaces. This filling liner 20 may be secured, as by countersunk screws or rivets 21, or otherwise, to the lower face of the filler block, and to make it have perfect contact with the pulley its lower surface is made with reversed slopes 20′, to fit the double, truncated, conical surfaces of the pulley.

In Figs. 3 and 4, I show two forms of the same belt-clamp elaborated to provide an even stronger grip on the belt ends. In the form shown in Fig. 3 the sloping sides of the filler block 12ª are transversely corrugated, as shown at 12ᵇ, and the inner sides of the clamp bars 13ª are similarly corrugated, as shown at 13ᵇ, and the belt ends are crimped and thus very rigidly and securely clamped between said corrugated surfaces, thereby increasing the hold of the clamp on the belt ends. The lower surface of the filler block is equipped with a cushion 20ª, which may be identical with the cushion 20 of Fig. 1; and in this view I have illustrated an alternative means of securing the cushion to the filler block consisting of a rod 22 extending lengthwise through the body of the filler block, and wire loops 23 extending over the rod 22 with their depending, bent ends anchored in the cushion.

In the form of the invention illustrated in Figs. 4 and 5, the filler block 12ᶜ is equipped with an important addition in the form of a T-head 24, the laterally-projecting sides of which bend back the extreme belt ends sharply over the top of the clamp bars 13ᶜ, as shown at 10ª and 11ª, and the opposed sides of the filler block and clamp bars are also preferably corrugated after the fashion shown in Fig. 3. When the entire belt is under strain, the stress is carried by the leverage of the clamp bars 13ᶜ reacting on the bolts, which have the strain increased by the leverage, the conteracting stresses being carried by compression at the top of the clamp bars, thus providing a very great pressure on the belt ends at this point. In the forms of clamp shown in Figs. 1 and 3, and in all other forms of this general type, so far as I am aware, the pull on the belt ends tends to bend the bolts downwardly, the intermediate filler-member tending to come down and the clamp bars tending to slip upwardly. In the form of the invention shown in Fig. 4 these opposed reactions are taken up or neutralized on the T-head projection, and the stresses become an added clamping pressure on the extreme belt ends lying between the T-head and the tops of the clamp bars, with the result that the extreme belt ends take the position shown in Fig. 4. Hence, there is no tendency in this form of clamp to any slippage of the parts, and the through bolts remain straight and are under better conditions of stress distribution, so that there is actually less stress in the bolts themselves. The bent ends are not only held more firmly, but, since the filler block 12ᶜ cannot slip, there is full friction on the corrugated faces of the filler block, whereas in the other forms shown, and all other clamps of this type, this full friction is not obtainable, and thus the T-head practically doubles the friction hold on the two belt ends, besides the added grip on the extreme belt ends between the T-head and the tops of the clamp bars. In this form of the invention I have also illustrated another practicable means for attaching the cushion 20ᵇ to the bottom face of the filler block, the same consisting of a series of vertical rivets 25 countersunk at their lower and upper ends in the cushion and T-head of the filler block, respectively.

Figure 6:
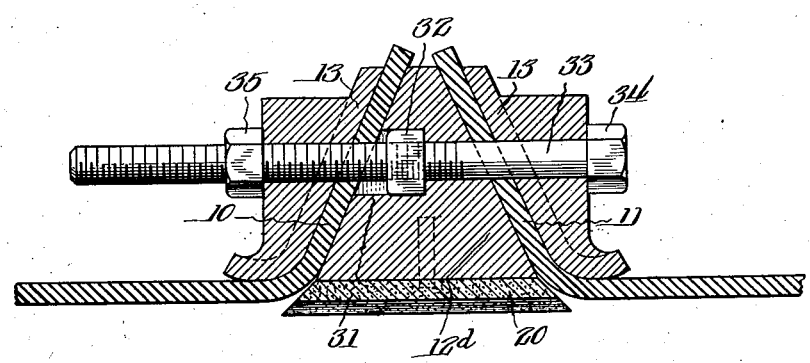
Fig. 6 shows a modified clamp bolt.

In Fig. 6 I illustrate another and cheaper form of clamp bolt that may be employed within the purview of the invention in any of the belt clamps shown, in lieu of the special bolt 15. Here the holes in the filler block 12ᵈ are formed with countersunk recesses 31, each adapted to house and hold non-rotatable an intermediate nut 32 that corresponds functionally to the bolt enlargement 15' previously described. Through the clamp bar 13, the belt end 11, the filler block 12ᵈ and the nut 32 is passed an ordinary long bolt 33 having the usual integral bolt head 34; the bolt being threaded through the nut until the parts 13, 11 and 12ᵈ are securely clamped. The long projecting end of the bolt is then passed through the other belt end 10 and the other clamp bar 13, and the outer nut 35 is then applied and turned up until the parts are all securely united, as above described. Here the intermediate nut 32 is in effect an enlargement on the bolt, with relatively short and long threaded portions of the latter on opposite sides thereof respectively.

I have herein presented, for purposes of illustration, several practical forms in which the principle of the invention may be embodied, that shown in Fig. 4 being the most efficient and having not less than the full tension strength of the belt itself. I do not, however, limit the invention to the structural forms and details shown, but reserve all such variations, modifications and mechanical equivalents as fall within the spirit and purview of the claims.

I claim—

1. In a belt clamp, the combination of a pair of clamp bars, a filler block of triangular cross-section against the sloping sides of which the belt ends lie, and means rigidly clamping together said clamp bars, belt ends and filler block.

2. In a belt clamp, the combination of a pair of clamp bars, said bars having registering holes, a filler block having corrugated sides against which the bent ends lie, said filler block having holes registering with the holes of said clamp bars, and through-bolts passed through said holes and belt ends.

3. In a belt clamp, the combination of a pair of clamp bars formed with corrugated inner faces, a rigid filler block having corrugated sides against which the belt ends lie, and means rigidly clamping together said clamp bars, belt ends, and filler block.

4. In a belt clamp, the combination of a pair of clamp bars formed with rounded lower edges supporting the bent portions of the belt ends and having their inner faces corrugated, said bars having registering holes, a rigid filler block having corrugated sloping sides against which the belt ends lie, and formed with holes registering with the holes in said clamp bars, and through-bolts passed through said holes and belt ends.

5. In a belt clamp, the combination with a filler block against which the belt ends lie, of two clamp bars lying against the other sides of the belt ends to press the latter against the sides of the filler block, and a fastening member capable of uniting one belt end to the filler block through one of said clamp bars prior to uniting the other belt end and clamp bar to said filler block.

6. In a belt clamp, the combination with a filler block formed with transverse holes each having a bearing seat, of clamping bolts each having end portions and an intermediate enlargement to engage one of said seats, and clamping means on said end portions, whereby said filler block and bolts may be attached to one belt end prior to the uniting of the belt ends thereby.

7. In a belt clamp, the combination with a filler block formed with transverse holes each having at one end a countersunk bearing seat, of clamping bolts each having relatively long and short threaded portions and an intermediate enlargement to fit said seats, and nuts on said threaded portions, whereby said filler block and bolts may first be attached to one belt end through the short threaded portions of said bolts, and the other belt end may then be engaged with the long threaded portions of said bolts and drawn by the nuts on the latter into engagement with said filler block.

8. A belt clamp composed of clamp bars, a filler block against which the belt ends lie, and bolts having an enlargement at the middle part, threaded portions on opposite sides of said enlargement, and clamping means on the ends of the bolts for securing the clamp bars against the belt ends.

9. In combination with a belt clamp including side bars and a filler block against which the belt ends lie, through bolts attaching the clamp bars to the filler block, said bolts being formed with tapered points to facilitate passes thereof through said side bars, filler block and belt ends.

10. In combination with a belt clamp including clamp bars and a filler block against which the belt ends lie, bolts for securing said clamp bars to said filler block, said bolts having an enlarged portion in the filler block, tapered points, and nuts on the ends of the bolts providing pressure against the clamp bars.

11. In a belt clamp, the combination of a pair of clamp bars, a filler block against the sides of which the belt ends are held by said clamp bars, said filler block being formed with a T-head operative to bend the extreme ends of the belt over the top edge of said clamp bars, and means for squeezing the belt ends between said clamp bars and filler block.

12. In a belt clamp, the combination of a pair of clamp bars, a filler block formed with sloping sides against which the belt ends are held by said clamp bars, said filler block having a T-head operative to bend the extreme ends of the belt over the top edges of said clamp bars, and means connecting said clamp bars through said filler block and belt ends operative, under the belt tension, to tightly grip said extreme belt ends between said T-head and the tops of said clamp bars.

13. In a belt clamp, the combination of a pair of clamp bars formed with corrugated inner sides, a filler block formed with corrugated sides against which the belt ends are held by said clamp bars, said filler block having a T-head operative to bend the extreme ends of the belt over the top edges of said clamp bars, and through-bolts compressing together said clamp bars, filler block, and belt ends.

14. In a belt clamp, the combination of a pair of clamp bars, a rigid filler block between the sides of which and said clamp bars the belt ends lie, means for clamping said bars and filler block on said belt ends, and a cushion of yieldable material attached to the lower face of said filler block.

15. In a belt clamp, the combination of a pair of clamp bars, a rigid filler block between the sides of which and said clamp bars the belt ends lie, means for clamping said bars and filler block on said belt ends, and a cushion of yieldable material attached to and covering the lower face of said filler block, said cushion having an outer face shaped to conform to the two conical parts of a crowned pulley.

16. In a belt clamp, the combination of a pair of clamp bars, a rigid filler block of triangular cross-section between the sloping sides of which and said clamp bars the belt ends lie, means for clamping said bars and filler block on said belt ends, and a cushion of yieldable material attached to and covering the lower face of said filler block, said cushion having an outer face shaped to conform to the two conical parts of a crowned pulley.

17. In combination with the upwardly curved ends of a belt, spacing means between said ends comprising a rigid filler block and a cushion of yieldable material attached to and covering the lower face of said filler block, and clamping means comprising a pair of clamp bars with connecting means binding together said clamp bars, filler block, and belt ends.

EDWIN VOLLRATH.